June 6, 1950  B. F. LINTON  2,510,703
CATTLE CHUTE
Filed April 12, 1946  5 Sheets-Sheet 1

INVENTOR.
Bert F. Linton
BY
ATTYS

June 6, 1950     B. F. LINTON     2,510,703
CATTLE CHUTE

Filed April 12, 1946     5 Sheets-Sheet 3

INVENTOR.
Bert F. Linton

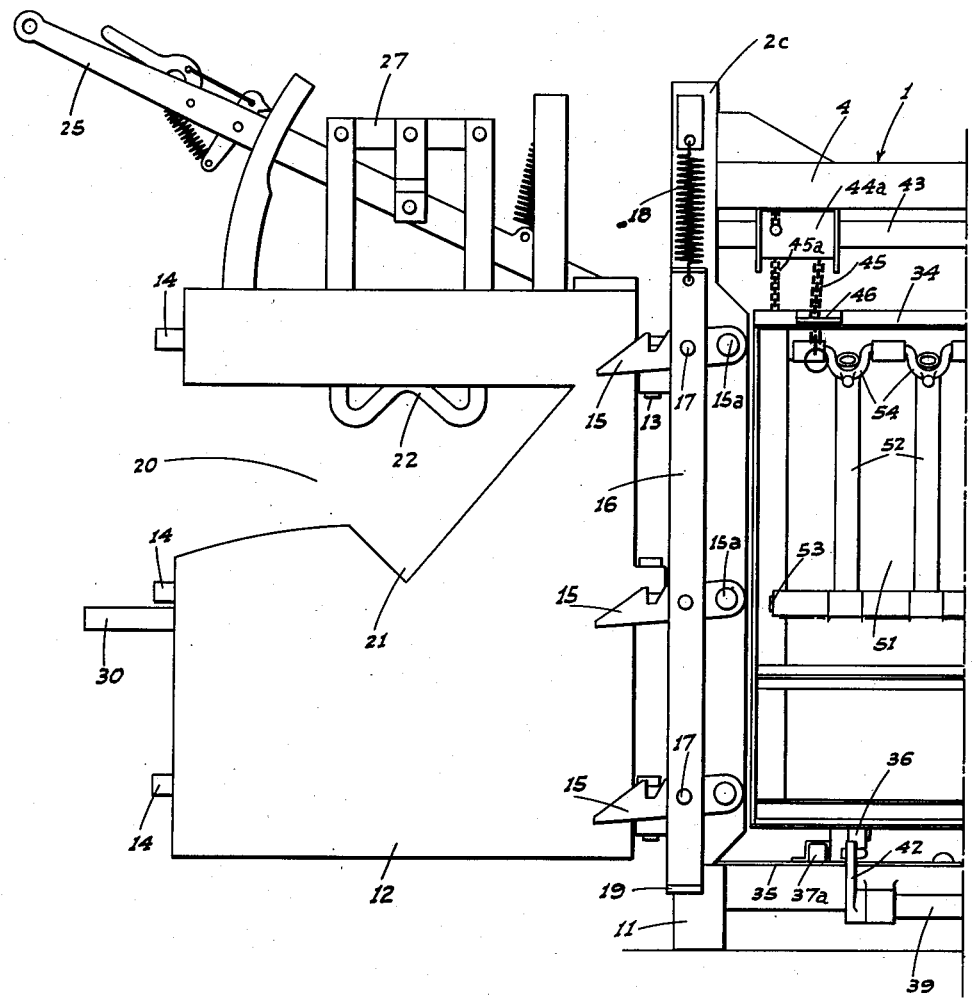

Patented June 6, 1950

2,510,703

UNITED STATES PATENT OFFICE 2,510,703

CATTLE CHUTE

Bert F. Linton, Visalia, Calif.

Application April 12, 1946, Serial No. 661,727

5 Claims. (Cl. 119—99)

This invention is directed to, and it is an object to provide, a cattle chute of novel construction and operation; such chute being of the type known as a "squeeze" wherein an animal is firmly held for the purpose of dehorning, vaccinating, branding, etc.

Another object of the invention is to provide a cattle chute, of the type described, which includes an entry gate, an exit gate, and adjustable side walls of improved design.

A further object of the invention is to provide a cattle chute, as above, arranged so that an animal can be placed in the chute, clamped against any substantial movement, and then treated and released; all readily and quickly.

Another object of the invention is to provide a cattle chute which is constructed for safety to the operators; the animal being so held, for dehorning, vaccinating or branding, that such animal cannot strike and injure an operator.

A further object of the invention is to produce a practical device and one which will be exceedingly effective for the purpose for which it is designed.

These objects are accomplished by means of such structure and relative arrangement of parts as will fully appear by a perusal of the following specification and claims.

In the drawings:

Fig. 5 is a fragmentary side elevation of the chute at the exit gate end thereof, with the exit gate in open position.

Figure 1:
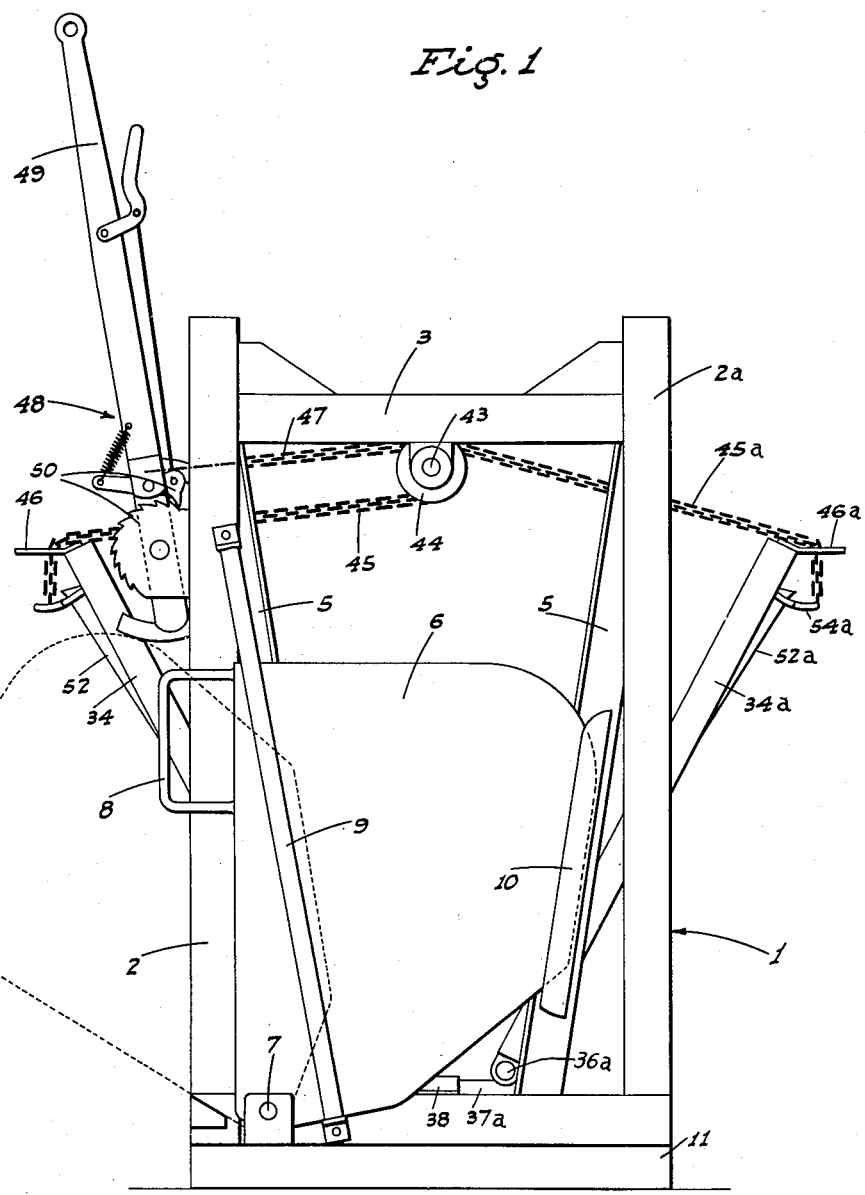
Fig. 1 is an end elevation of the entry end of the chute showing the entry gate closed.
Figure 2:
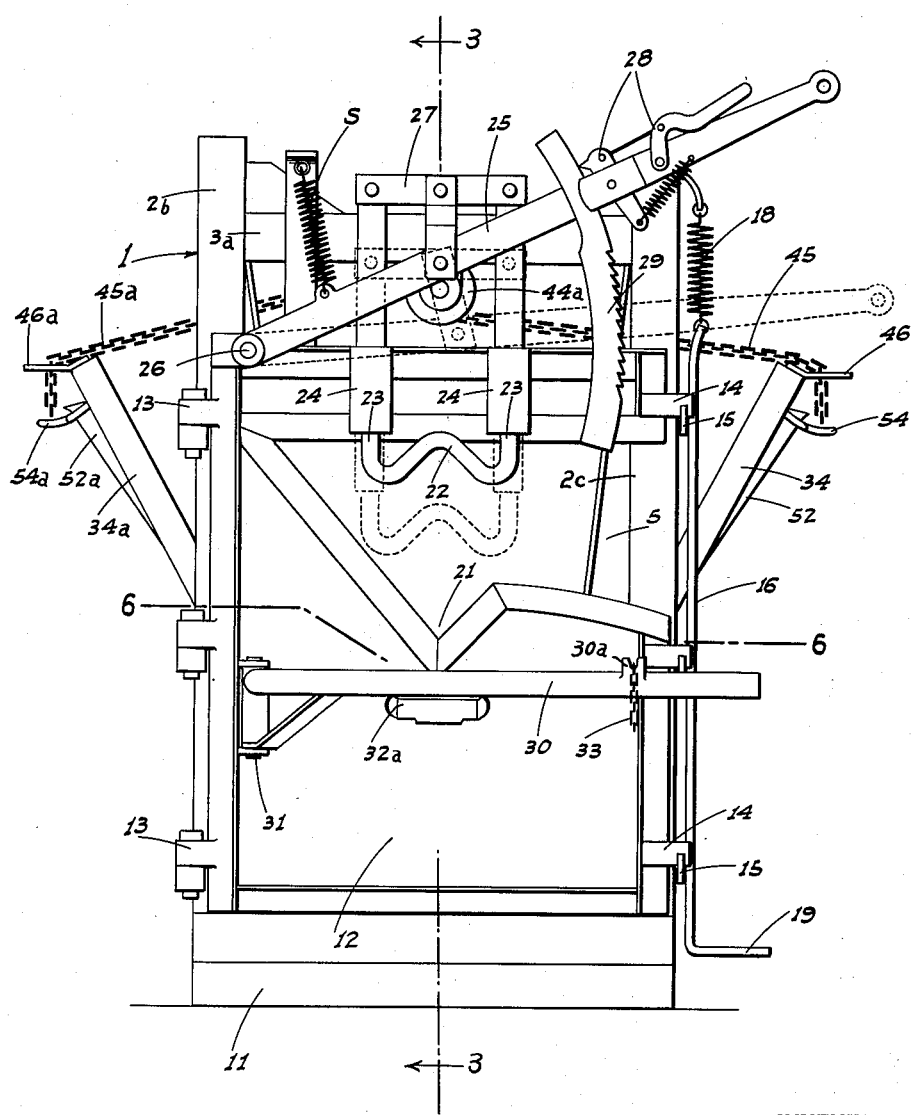
Fig. 2 is an opposite end elevation of the exit end of the chute showing the exit gate closed.
Figure 3:
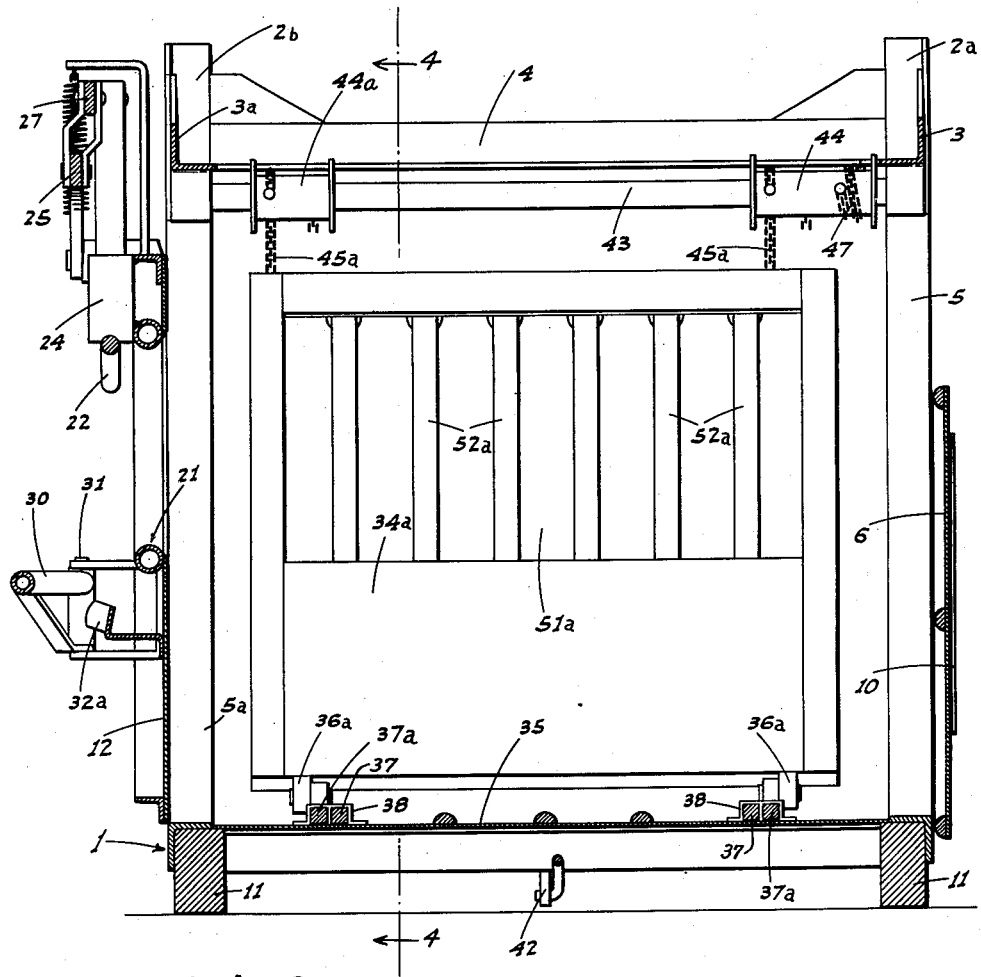
Fig. 3 is a longitudinal sectional elevation of the chute substantially on line 3—3 of Fig. 2.

In Fig. 1, the exit gate and its associated mechanism has been omitted, and in Fig. 2 the entry gate has also been omitted, for clarity and to avoid confusion of parts in the different views.

Referring now more particularly to the characters of reference on the drawings, the chute comprises an upstanding rectangular main frame, indicated generally at 1, and which main frame is of open construction, including corner posts 2, 2a, 2b and 2c, top cross beams 3 and 3a at the ends, and longitudinal top beams 4 and 4a in transversely spaced relation. The main frame 1, together with substantially all of the remainder of the chute, is of metal, with the parts secured together, as by welding or bolting.

The chute, lengthwise through the upstanding main frame 1, is defined, at opposite ends, by pairs of upwardly divergent end braces 5 and 5a fixed in the frame. At one end the main frame 1 supports an entry gate 6 which is of flat sheet metal, suitably reinforced; said entry gate being pivoted, adjacent its lower left hand corner, as at 7, on the main frame 1 for lateral swinging movement between a closed position, as shown in full lines in Fig. 1, to an open position, as shown in dotted lines in said figure. The entry gate 6 includes a control handle 8, and said gate slidably extends between the corner post 2 adjacent pivot 7 and a guide rod 9 spaced outwardly from said post. On the opposite side of the frame the entry gate 6 seats in a channel 10 on the adjacent end brace 5 when said entry gate is in closed position. When the entry gate is closed it is thus impossible for an animal to back out of the chute.

The chute is intended to be portable and at opposite ends of the main frame 1 the latter is provided with ground engaging cross beams 11.

At the end opposite the entry gate 6 the chute is provided with an exit gate, indicated generally at 12, which exit gate is of sheet metal suitably reinforced, and mounted for lateral swinging or opening movement in a horizontal plane, as follows:

Along one vertical edge thereof the exit gate 12 is hinged, as at 13, to the adjacent corner post 2. At the opposite vertical edge the exit gate 12 is provided with a plurality of laterally outwardly projecting rigid tongues 14 which normally engage with corresponding, upwardly notched, downwardly yieldable latch plates 15 pivoted, as at 15a, on the corner post 2 opposite the hinges 13. A vertical release bar 16 extends in intersecting relation to each of the latch plates 15 and is pivoted thereto, as at 17; said release bar, and consequently the latch plates 15, normally being urged in an upward direction by a tension spring 18 connected between the upper end of said bar and the adjacent corner post 2. When the exit gate 12 is swung closed, the tongues 14 snap into the pivoted latch plates 15 by reason of tapered forward edges on the latter, as shown. Thereafter, the tongues 14 remain latched, and the exit gate 12 closed, until the latch plates 15 are depressed, which is accomplished by means of a foot pedal 19 on the lower end of the release bar 16.

The exit gate 12 serves, when closed, as a head clamping assembly for an animal in the chute, which assembly comprises the following:

The exit gate 12 is provided, in its upper half, with a transverse opening 20 which opens to the free edge of said gate between the upper and intermediate tongues 14; said opening 20 being formed, in its lower edge, with a V-shaped neck receiving notch 21 centered in the gate between opposite sides thereof.

Above and in vertical alinement with the neck receiving notch 21 the exit gate is fitted, exteriorly thereof, with a vertically movable, neck engaging yoke 22 of inverted V-shape, which yoke includes a pair of vertical legs 23 which extend upwardly through guide sleeves 24 fixed on the gate. A transversely extending, vertically swingable hand lever 25 is pivoted, as at 26, at the top and adjacent the hinged edge of the exit gate 12. Said hand lever 25 is connected by an actuating linkage 27 with the upper ends of the legs 23, whereby vertical swinging movement of said lever effects vertical adjustment of the neck engaging yoke 22 relative to the neck receiving notch 21. The hand lever 25 is held in any operative position of adjustment thereof by a manually releasable, spring-engaged pawl unit 28 which cooperates with a segmental ratchet bar 29 likewise mounted on the exit gate 12. A tension spring S connects with the hand lever 25 in a manner urging the latter upwardly, whereby to maintain the yoke 22 fully elevated when the pawl unit 28 is released from and rides above the ratchet portion of the bar 29.

Figure 6:
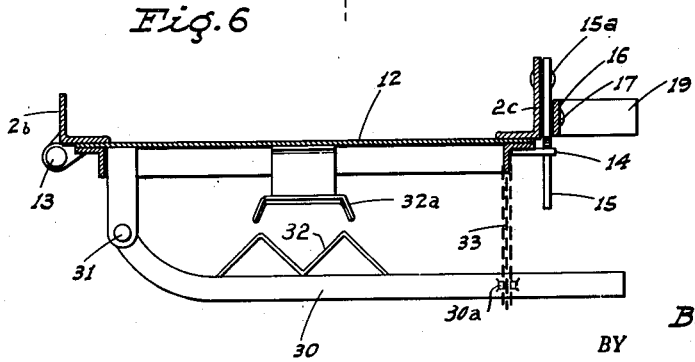
Fig. 6 is a fragmentary sectional plan on line 6—6 of Fig. 2, and illustrates the nose clamping assembly.

The exit gate 12 is fitted, on the outside thereof and below the neck receiving notch 21, with a transverse nose clamping bar 30 hinged, as at 31, to said gate for swinging in a horizontal plane; there being a nose engaging clamp member 32 on the bar and a cooperating mouth or chin engaging cradle 32a on the adjacent portion of the gate in vertical alinement with the neck receiving notch 21. The member 32 is arranged to form a central V facing the gate, while member 32a is of relatively shallow flat trough form, facing member 32 as shown in Fig. 6. The members 32 and 32a are disposed in such spaced relation that when the neck of an animal is in notch 21, the nose and mouth will be engaged by and clamped between members 32 and 32a, respectively, when the bar 30 is closed and latched. Adjacent but short of the end opposite the hinge 31 the clamping bar 30 is provided with an upstanding notched lug 30a, the notch of which releasably engages a link of a latch chain 33 which at one end connects to the adjacent portion of the gate.

The sides of the chute are defined by opposed sidewall units, indicated generally at 34 and 34a, which are mounted for lateral swinging adjustment, as well as for adjustment of the lateral spacing thereof in the bottom, as follows:

The chute includes, at the bottom thereof, a relatively narrow, longitudinally extending bottom platform 35, and the side wall units 34 extend upwardly therefrom in laterally divergent relation. At spaced points along the lower edges of each thereof the side wall units 34 and 34a are hinged, as at 36 and 36a, respectively, for swinging motion as described, and the hinges 36 are carried on slide bars 37 transversely slidably supported on the bottom platform 35 by guides 38.

Figure 4:
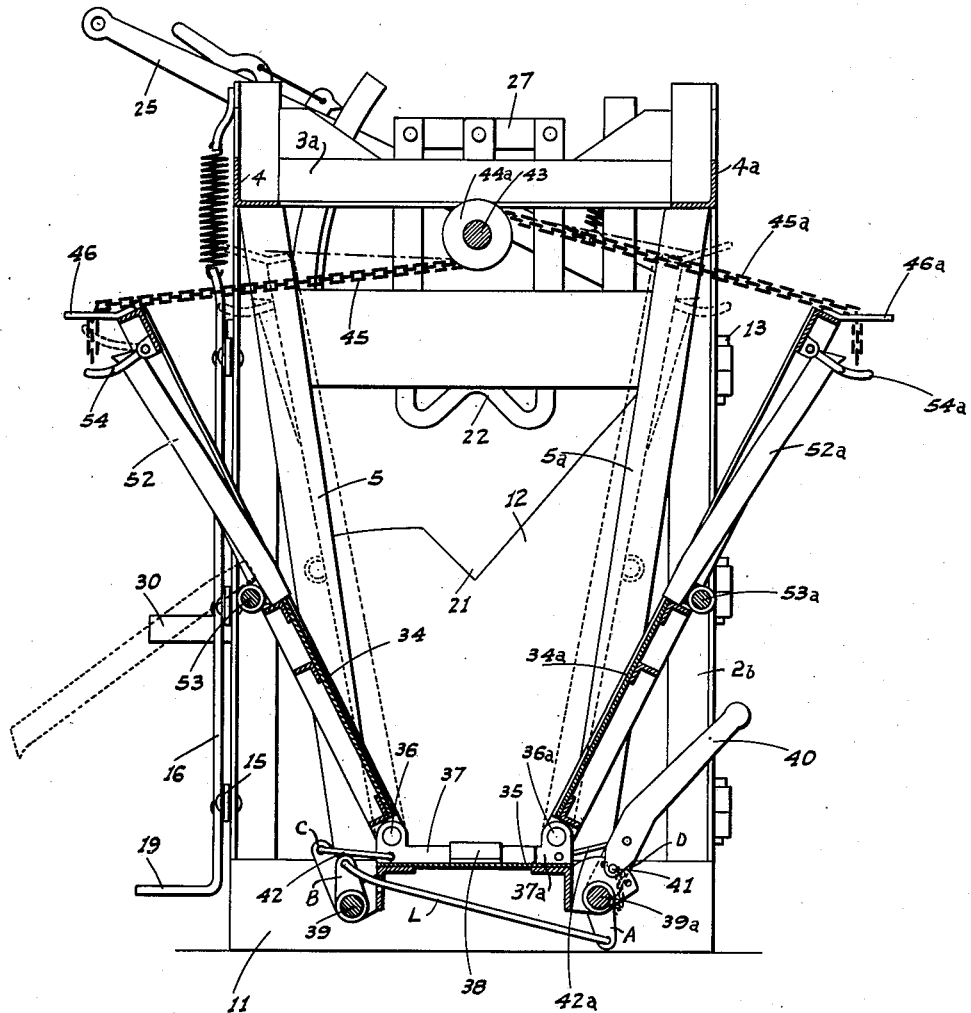
Fig. 4 is a transverse sectional elevation of the chute on line 4—4 of Fig. 3 looking toward the exit gate.

The spacing of the sidewall units 34 and 34a at their lower edges, for the purpose of accommodating animals of different sizes, may be varied by the following mechanism:

Longitudinal shafts 39 and 39a extend along opposite sides of the bottom platform 35, and shaft 39a is fitted with an exposed radial hand lever 40 adapted to be held in selected positions of adjustment by means of a removable pin and quadrant lock, indicated at 41. Movement of the hand lever 40 is imparted therefrom to the slide blocks 37 through the medium of a lever and linkage assembly 42 associated with said lever and the shafts 39. As shown in Fig. 4, rotation of shaft 39a by lever 40 is imparted to shaft 39 in the opposite direction by means of a radial arm A depending from shaft 39a and a similar arm B upstanding from shaft 39; these arms being connected by a link L. This shaft movement is imparted to bars 37 and 37a in opposite directions by upstanding radial arms C and D on shafts 39 and 39a, respectively; links 42 and 42a connecting arms C and D with said bars 37 and 37a, respectively.

Swinging motion of the sidewall units 34 and 34a transversely of the chute, and for the purpose of clamping or squeezing an animal therebetween, is accomplished as follows:

A longitudinally extending, horizontal shaft 43 is mounted in the main frame 1 at the top and centrally of the sides thereof; said shaft being fitted, adjacent its ends, with chain drums 44 and 44a. A pair of adjustment chains 45 and 45a are reversely wound on each drum and thence extend outwardly in opposite directions to the corresponding sidewall units 34 and 34a at the top of the latter. The chains are adjustably connected at their free end to the corresponding sidewall units by engagement of a link thereof with notched keyhole-slotted plates 46 and 46a projecting laterally out from the sidewall units 34 and 34a, respectively. The rotation of the shaft 43 is controlled through the medium of an operating chain 47 wound about chain drum 44, and thence leading laterally to a hand winch 48 mounted on one side of the main frame 1. The hand winch 48 includes an upstanding hand lever 49 and a manually releasable spring-engaged pawl and ratchet unit 50 which normally maintains the winch in a fixed position.

For access to an animal held in the chute, the sidewall units 34 and 34a are formed with an upper open portion 51 and 51a, respectively which extends full length thereof, said open upper portion being intersected by a plurality of spaced vertical bars 52 and 52a respectively pivoted at their lower ends, as at 53 and 53a respectively, for outward hinging or opening movement; said bars 52 and 52a normally being held in upstanding closed position by manually releasable swing catches 54 and 54a pivoted on the sidewall units 34 and 34a respectively adjacent the upper edges thereof. The swing catches 54 and 54a are accessible from exteriorly of the chute.

*Operation*

In operation of the above described chute the exit 12 is first closed and then the entry gate 6 is opened and the animal driven into the chute between the sidewall units 34 and 34a, whereupon said entry gate 6 is swung to closed position. The animal stands in the chute on the bottom platform 35, and its neck projects through the transverse opening 20 in the exit gate 12, with the neck resting in the neck receiving notch 21.

The hand lever 25 is then swung downward to a latched position with the neck engaging yoke 22 positively clamping the animal's neck between said yoke and the notch 21.

After the animal's neck is thus clampingly engaged, the bar 30, which is initially open, is swung to closed position and latched by the chain 33 with the animal's nose gripped between the clamp members 32 and 32a. This prevents the animal from tossing its head about, and holds the head relatively still for the purpose of dehorning, etc.

In order to prevent the animal from thrashing about in the chute, the sidewall units 34 and 34a are swung laterally inwardly by means of the hand winch 48 until said sidewall units relatively forcefully clamp or squeeze the animal, from the sides, in the chute. As so held, the animal can be readily branded or vaccinated; access to the animal being accomplished by release and opening of certain of the hingedly mounted bars 52 or 52a.

After the animal has been treated the nose clamping bar 30 is opened, the neck engaging yoke 22 is raised, and the foot pedal 19 is depressed, releasing the latch plates 15 from the tongues 14. When this occurs the exit gate 12 is swung open and the animal escapes from the chute. With opening of the exit gate 12, as above, the animal's neck passes out of the neck receiving notch 21 and slides from said gate through the transverse opening 20.

With the above described chute animals can be handled rapidly, effectively, and without danger to the operators. Additionally, animals of varying sizes can be accommodated in the chute by reason of the adjustability thereof, as described.

From the foregoing description it will be readily seen that there has been produced such a device as substantially fulfills the objects of the invention, as set forth herein.

While this specification sets forth the present and preferred construction of the device, still in practice such deviations therefrom may be resorted to as do not form a departure from the spirit of the invention, as defined by the appended claims.

Having thus described the invention, the following is claimed as new and useful and upon which Letters Patent are desired:

1. An animal holding chute comprising an upstanding frame, an entry gate mounted on one end of the frame, transversely spaced upstanding side wall units defining a chute ahead of the entry gate, means mounting the side wall units in connection with the frame for lateral swinging motion whereby to vary the spacing of said side wall units, means operative to so move the side walls units, and an exit gate mounted on the frame at the end opposite the entry gate; said exit gate unit being hinged along one side edge for horizontal opening movement and having a transverse opening therethrough in its upper half extending and being open to the other edge thereof, and means on the exit gate unit arranged to clampingly engage an animal's neck projecting through said opening from within the chute.

2. An animal holding chute comprising an upstanding frame, an entry gate and an exit gate at opposite ends of the frame, respectively, transversely spaced upstanding side walls defining a chute between said gates, said side walls being hinged at their bottom edges to the frame whereby said walls may be swung laterally relative to each other to vary the space between said walls, a shaft journaled on the frame longitudinally thereof and substantially midway between the side walls, spaced drums on the shaft, flexible elements reversely wound on each drum and extending in opposite directions to connection with corresponding side walls adjacent the upper edge of the latter, a lever fulcrumed adjacent one side of the frame for swinging in a plane transversely of the longitudinal plane of the frame, another flexible element wound about one of the drums and connected with the lever, and a ratchet and dog unit interposed between the lever and frame whereby the lever may be locked in any selected position.

3. An animal holding chute comprising an upstanding frame, an entry gate and an exit gate at opposite ends of the frame, respectively, animal confining side walls in the frame between the gates, the exit gate being provided with an opening through which the head of an animal may project, a lever pivoted to the exit gate adjacent one edge of the gate and above said opening, such lever extending transversely across the face of the exit gate and to a point beyond the plane of the side of the frame opposite that side adjacent which the lever is pivoted, the lever being mounted on a horizontal pivot for vertical swinging movement of the lever, a ratchet and dog unit connected between the exit gate and lever whereby the latter may be locked in any selected position, vertically disposed guides fixed on the face of the exit gate above the opening, a yoke having legs slidably mounted in said guides whereby the yoke may be moved across or clear of said opening in the exit gate, and operating linkage connected between the yoke legs and the lever.

4. A chute as in claim 3, including yieldable means between the lever and exit gate and normally tending to hold the lever in elevated position.

5. An animal holding chute comprising an upstanding frame, an entry gate mounted on one end of the frame, an exit gate mounted on the other end of the frame, transversely spaced upstanding side wall units defining a chute between said gates, means mounting the side wall units in connection with the frame for lateral swinging motion whereby to vary the spacing of said side wall units, and means operative to so move the side wall units; the frame including a longitudinally extending bottom platform to support an animal between the side wall units, and said mounting means pivotally and laterally adjustably connecting the wall units at their lower edges to the platform; said mounting means including slide bars arranged in guided relation on the platform; there being a lever-actuated mechanism connected to the slide bars and arranged to shift said bars corresponding to the separate side wall units in opposite directions simultaneously.

BERT F. LINTON.

REFERENCES CITED

The following references are of record in the file of this patent:

UNITED STATES PATENTS

| Number | Name | Date |
|---|---|---|
| 209,257 | Hadley et al. | Oct. 22, 1878 |
| 425,478 | Webster | Apr. 15, 1890 |
| 564,676 | Witherell et al. | July 28, 1896 |
| 821,454 | Bidwell | May 22, 1906 |
| 1,181,615 | Roberts | May 2, 1916 |
| 1,271,343 | Manning | July 2, 1918 |
| 1,356,479 | Werner | Oct. 19, 1920 |
| 2,114,995 | Coe | Apr. 26, 1938 |
| 2,136,008 | Gregory | Nov. 8, 1938 |
| 2,308,213 | Shearer | Jan. 12, 1943 |
| 2,396,928 | Parsons | Mar. 19, 1946 |